D. E. BROWN & L. E. KETCHERSIDE.
COMBINED TIRE TRUNK AND TOOL BOX.
APPLICATION FILED MAY 13, 1915.
1,186,073.
Patented June 6, 1916.
2 SHEETS—SHEET 1.
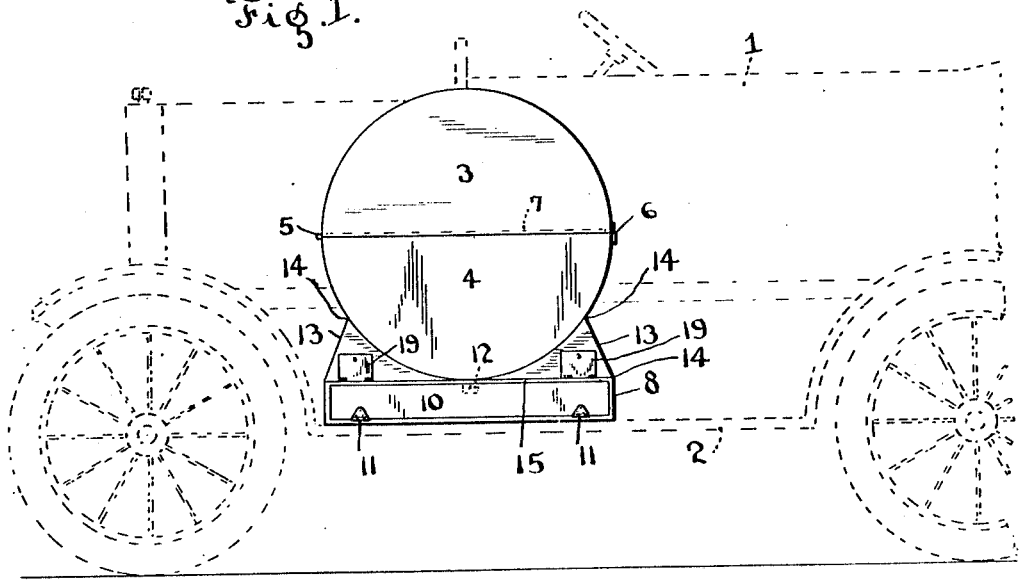
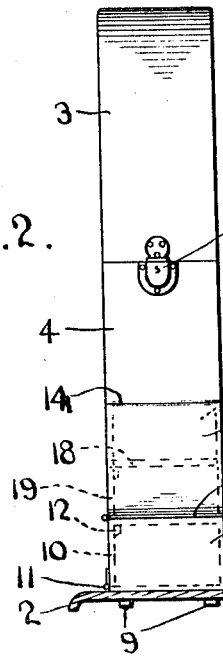
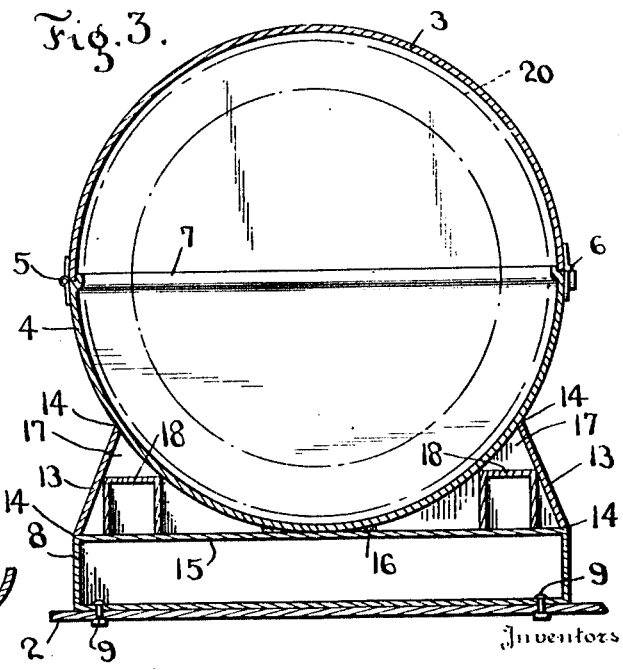
Witnesses
L. B. James
P. H. Pattison
Inventors
Drewery E. Brown &
Lewis E. Ketcherside
By Mansell & Mills
Attorney D. E. BROWN & L. E. KETCHERSIDE.
COMBINED TIRE TRUNK AND TOOL BOX.
APPLICATION FILED MAY 13, 1915.
1,186,073.
Patented June 6, 1916.
2 SHEETS—SHEET 2.
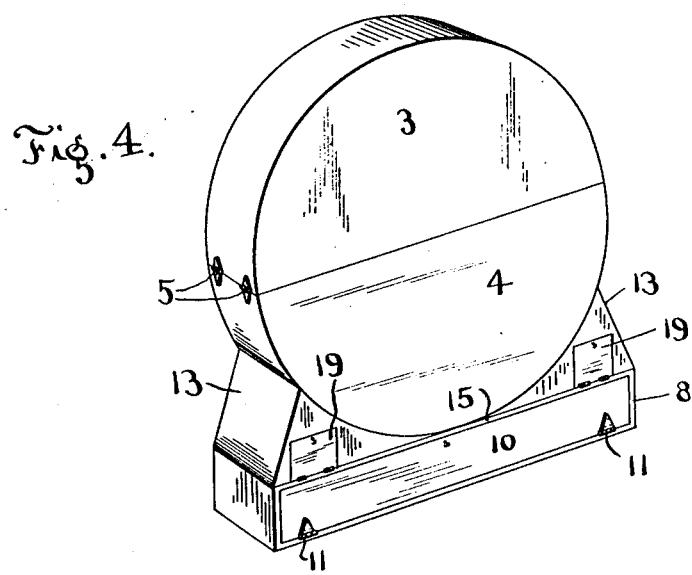
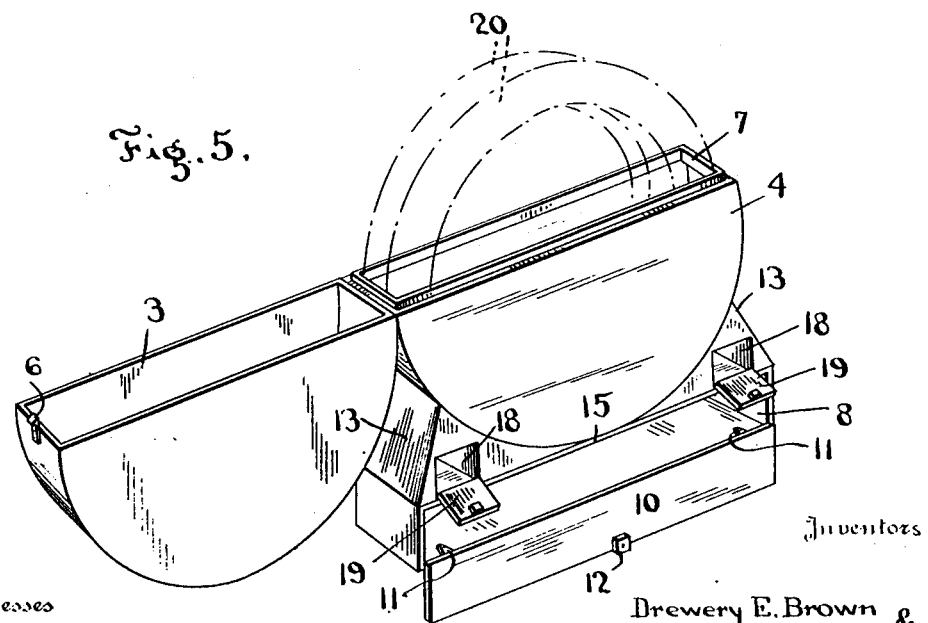

UNITED STATES PATENT OFFICE.

DREWERY E. BROWN AND LEWIS E. KETCHERSIDE, OF DESLOGE, MISSOURI.

COMBINED TIRE-TRUNK AND TOOL-BOX.

1,186,073.  Specification of Letters Patent.  Patented June 6, 1916.

Application filed May 13, 1915. Serial No. 27,821.

*To all whom it may concern:*

Be it known that we, DREWERY E. BROWN and LEWIS E. KETCHERSIDE, citizens of the United States, residing at Desloge, in the county of St. Francois and State of Missouri, have invented certain new and useful Improvements in Combined Tire-Trunks and Tool-Boxes, of which the following is a specification.

This invention relates to new and useful improvements in tire carriers for motor vehicles, and has for its primary object to provide a device of this character in which means is also provided for the storage of automobile tubes.

A further object of the invention is to provide a device of this character which will be neat in appearance and is readily attached to the ordinary motor vehicle.

Referring to the drawings; Figure 1 is a partial side elevation of a motor vehicle showing the present device attached thereto; Fig. 2 is an edge view of the device showing the running board of the machine broken away and partly in section; Fig. 3 is a vertical sectional view of the device; Fig. 4 is a perspective view with the cover closed, and Fig. 5 is a perspective view with the cover open.

Referring more particularly to the drawings by reference character, the numeral 1 designates the body of an automobile and 2 the running board thereof.

The tire trunk consists of two semi-circular members 3 and 4 which are hinged together as at 5, and are provided with a suitable lock to secure the members in closed position. The semi-circular member 4 is provided on its upper edge with an upstanding flange 7 which is adapted to be received within the semi-circular member 3 when the members are in the closed position.

The base for the tire trunk consists of a hollow box 8 which is secured to the running board 2 by means of bolts 9 which pass through the running board and the bottom of the box, this box being provided with a door 10 hinged as at 11 to the bottom and provided with a lock 12 by which the door can be secured when closed.

Extending upwardly from the top of the box portion 8 on opposite ends thereof is an inclined wall 13 which walls are secured at their upper edge to the semi-circular member 4 by solder or the like as at 14, and the lowest part of the semi-circular member 4 is secured to the top wall 15 of the box 8 by solder or the like as at 16. The inclined walls 13 and the circular portion of the semi-circular member 4 provide compartments 17 which are bounded by the inclined walls 13, the circular portion of the lower semi-circular member 4 and the top wall 15 of the box 8, and in each of these compartments is placed a rectangular box like member 18 each of which is provided with a hinged door 19 for closing the same.

From the foregoing it will be seen that tires such as designated by 20 are placed in the lower semi-circular member 4, and the semi-circular member 3 is then swung on its hinges 5 to the position shown in Fig. 1 where it closes the tire trunk and is securely locked thus preventing the removal of the tires from the trunk by unauthorized persons. The box 8 together with the boxes 18 provide compartments for the storage of automobile tools, and for this purpose utilize space which would otherwise be wasted.

Having thus described the invention what is claimed and desired to protect by Letters Patent is:

1. In combination with a motor vehicle and the running board thereof, a rectangular receptacle rigidly secured to the running board, a circular receptacle secured to the top of the rectangular receptacle, inclined walls connecting the top of the rectangular receptacle with the circular receptacle, and compartments in the space between the top of the rectangular receptacle and the circular receptacle.

2. In combination with a motor vehicle and the running board thereof, a rectangular receptacle rigidly secured to the running board, a circular receptacle secured to the top of the rectangular receptacle, and having a hinged cover, inclined walls connecting the ends of the rectangular receptacle with the circular receptacle, and compartments in the space between the top of the rectangular receptacle, the curved receptacle and the inclined walls.

3. In combination with a motor vehicle and the running board thereof, a rectangular receptacle rigidly secured to the running board, two inverted semi-circular members secured to the top of the rectangular compartment, inclined walls connecting the ends of the rectangular compartment to the lower semi-circular compartment, and rectangular compartments between the lower semi-circular compartment and the top of the rectangular compartment.

In testimony whereof we affix our signatures in presence of two witnesses.

DREWERY E. BROWN.
LEWIS E. KETCHERSIDE.

Witnesses:
R. L. SHANNON,
THOMAS CHAS. WELBORN.